R. M. RUSSELL.
ANIMAL DRINKING FOUNTAIN.
APPLICATION FILED FEB. 18, 1916.

1,218,899.

Patented Mar. 13, 1917.

Inventor
R. M. Russell
By N. S. Hie
Attorney

UNITED STATES PATENT OFFICE.

ROBERT MEHAREY RUSSELL, OF BOULEVARDE MIRANDA, NEAR SYDNEY, NEW SOUTH WALES, AUSTRALIA.

ANIMAL DRINKING-FOUNTAIN.

1,218,899.  Specification of Letters Patent.  Patented Mar. 13, 1917.

Application filed February 18, 1916. Serial No. 79,127.

*To all whom it may concern:*

Be it known that I, ROBERT MEHAREY RUSSELL, a subject of the King of Great Britain, residing at the Boulevarde Miranda, near Sydney, in the State of New South Wales and Commonwelath of Australia, have invented a new and useful Animal Drinking-Fountain, of which the following is a specification.

This invention relates to systems for supplying water to animals wherein is a water supply service or a main reservoir and a secondary reservoir or tank with an automatic valve or ballcock to control the water supply thereto and a plurality of drinking troughs or cups or founts arranged to hold their contents at about the same level as in the secondary reservoir. And this invention has been specially devised in order to provide that such drinking troughs or cups or founts may be cheaply constructed and will have comparatively long life, will not be easily disarranged, and will be easily and quickly cleansed with comparatively little or no loss of water.

Figure 1:
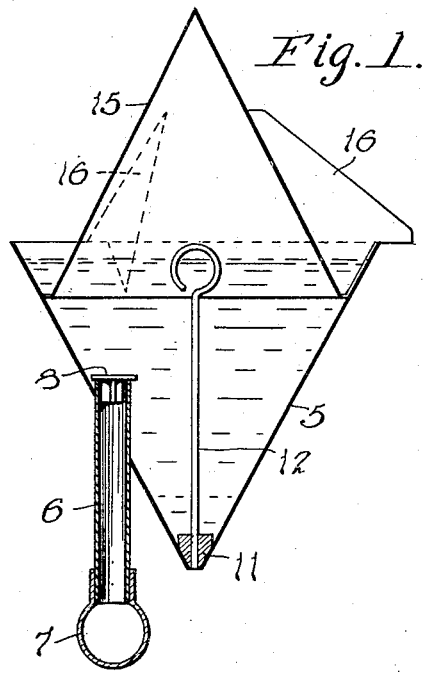
Figure 3:
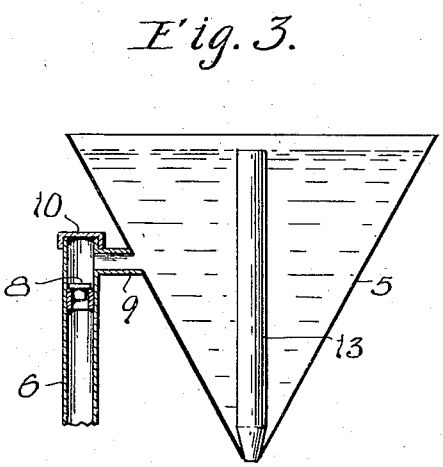
Figure 2:
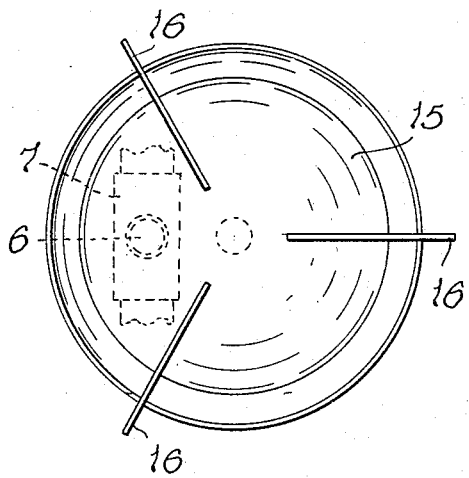
Figure 4:
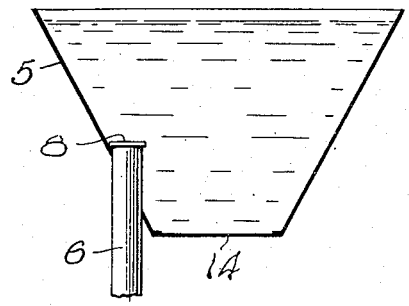

But in order that a practical application of this invention may be readily understood it will now be described with reference to the drawings accompanying and forming part of this specification in which Figure 1 is a sectional elevation of a conical drinking cup embodying these improvements Fig. 2 is a plan thereof and Figs. 3 and 4 are sectional elevations of modified constructions of same.

The cup 5 is held upon vertical pipe stem 6 branching from service pipe 7 and having on its upper end a non-return or lift valve 8. Said stem 6 however may have the valve 8 in its bore and its upper end closed by a cap 10 and an offset 9 to the cup 5.

The bottom of the cup 5 preferably has an orifice in it closed by a cork or other plug 11 on a stem or handle 12 or by a wooden plug 13 or the bottom may be flat and closed as at 14 (Fig. 4). The cup 5 may have a guard or cover which is preferably conical such as 15 with radial supporting wings 16 adapted to keep it supported sufficiently clear of the cup sides to allow free access to the water. The mouth of the conical cover 15 is smaller than the mouth of the cup 5 so as to fit within the latter, and the radial supporting wings 16 are in the form of plates which have the lower edges thereof suitably notched to engage the top of the cup 5 to support the cover with the edge thereof clear of the sides of the cup.

The cup or trough instead of being supported on its supply pipe might have any convenient support from the ground.

In use the water supply to the secondary tank is regulated by an automatic supply valve as usual and maintains an arbitrarily fixed level which also of course is the level of the contents of the several respective drinking troughs or cups 5 to which the animals have access and when guard 15 is used the young are protected from immersion in such cups. When it is desired to cleanse the trough or cup 5 this may be done by closing the supply to said trough or cup by pressing on the lift valve 8 or loading this valve and removing the plug 11 or 13 when there is one.

What I claim as my invention and desire to secure by Letters Patent is:—

A drinking fountain for live stock, including a cup formed with smooth upwardly flared sides, a removable cover closed at the top and formed with downwardly flared smooth sides, the mouth of the cover being smaller than that of the cup so that it will extend downwardly into the same below the surface of the water therein, and flat radial plates projecting from the exterior of the cover, said plates being vertically disposed and having the lower ends thereof formed with notched seats for engagement with the upper edge of the cup to support the cover with the lower edge thereof slightly clear of the sides of the cup.

In testimony whereof I have signed my name to this specification in the presence of two subscribing witnesses.

ROBERT MEHAREY RUSSELL.

Witnesses:
 PERCY NEWELL,
 H. B. CAMPBELL.